US009663158B2

(12) United States Patent
Jutz et al.

(10) Patent No.: US 9,663,158 B2
(45) Date of Patent: May 30, 2017

(54) TRACTOR COUNTERWEIGHT MOUNTING

(71) Applicant: AGCO International GmbH, Hesston, KS (US)

(72) Inventors: Georg Jutz, Marktoberdorf (DE); Tassilo Schulze, Stockelsdorf (DE); Matthias Gwosdz, Kempten (DE)

(73) Assignee: AGCO International GmbH, Neuhausen (CH)

( * ) Notice: Subject to any disclaimer, the term of this patent is extended or adjusted under 35 U.S.C. 154(b) by 95 days.

(21) Appl. No.: 14/505,796

(22) Filed: Oct. 3, 2014

(65) Prior Publication Data

US 2015/0097362 A1    Apr. 9, 2015

(30) Foreign Application Priority Data

Oct. 3, 2013   (GB) .................................. 1317493.3

(51) Int. Cl.
| | |
|---|---|
| *B60S 9/00* | (2006.01) |
| *B62D 49/06* | (2006.01) |
| *B62D 49/08* | (2006.01) |
| *E02F 9/18* | (2006.01) |
| *A01B 59/06* | (2006.01) |

(52) U.S. Cl.
CPC ........ *B62D 49/0628* (2013.01); *A01B 59/064* (2013.01); *B62D 49/085* (2013.01); *E02F 9/18* (2013.01); *A01B 59/066* (2013.01); *B62D 49/0642* (2013.01)

(58) Field of Classification Search
CPC .............. B62D 49/0628; B62D 49/085; B62D 49/0642; B62D 49/065; A01B 59/064; A01B 59/066; E02F 9/18; Y10T 403/608; Y10T 403/602; Y10T 403/599; Y10T 403/595
USPC ........... 280/759; 172/272; 56/14.9; 403/330, 403/322.4, 325, 327
See application file for complete search history.

(56) References Cited

U.S. PATENT DOCUMENTS

| | | | | |
|---|---|---|---|---|
| 3,011,800 A | * | 12/1961 | Mitsuyasu ............. | B60D 1/155 280/482 |
| 3,056,458 A | * | 10/1962 | Gray .................... | A01B 59/004 172/239 |
| 4,623,024 A | | 11/1986 | Schlenker | |

(Continued)

FOREIGN PATENT DOCUMENTS

| | | |
|---|---|---|
| EP | 0422721 A1 | 4/1991 |
| GB | 1462977 A | 1/1977 |

(Continued)

OTHER PUBLICATIONS

Intellectual Property Office, Search Report for UK Application No. GB1317493.3, dated Mar. 28, 2014.

(Continued)

*Primary Examiner* — Chi Q Nguyen

(57) ABSTRACT

A top link for a tractor front counterweight support linkage. The link is a fixed length elongate body having at a first end a pivoting connection with a chassis of the tractor and at a second end a slot to slidably receive an attachment bolt connectable to a tractor front counterweight. The link further includes a mechanism to selectively permit or prevent sliding movement of an attachment bolt received in the slot.

12 Claims, 5 Drawing Sheets

(56) References Cited

U.S. PATENT DOCUMENTS

| | | | | |
|---|---|---|---|---|
| 5,042,588 A * | 8/1991 | Herchenbach | ....... | A01B 59/004 172/439 |
| 5,299,469 A * | 4/1994 | Meyer | ....... | F16C 7/06 403/104 |
| 5,361,850 A * | 11/1994 | Muller | ....... | A01B 59/041 172/439 |
| 6,149,180 A * | 11/2000 | Haws | ....... | A01B 59/004 172/272 |
| 7,293,791 B1 * | 11/2007 | Williams, Jr. | ....... | B60D 1/00 280/478.1 |
| 7,658,569 B2 * | 2/2010 | de Oliveira | ....... | A01B 59/004 403/322.4 |
| 7,975,776 B2 * | 7/2011 | Chimento | ....... | A01B 59/002 172/272 |
| 8,434,787 B2 * | 5/2013 | Halepatali | ....... | E02F 3/627 212/178 |
| 8,925,964 B1 * | 1/2015 | Duppong | ....... | B62D 49/0628 212/195 |
| 9,179,590 B2 * | 11/2015 | Heitlinger | ....... | A01B 59/041 |
| 2007/0102168 A1 | 5/2007 | Oliveira | | |
| 2008/0006416 A1 * | 1/2008 | Hubscher | ....... | A01B 59/06 172/460 |
| 2011/0243653 A1 * | 10/2011 | Buckingham | ....... | B60N 2/2806 403/322.4 |

FOREIGN PATENT DOCUMENTS

| | | |
|---|---|---|
| GB | 1547710 A | 6/1979 |
| GB | 2079126 A | 1/1982 |
| GB | 2175484 A | 12/1986 |
| WO | 00/51613 A1 | 9/2000 |

OTHER PUBLICATIONS

European Patent Office, Search Report for related EP Application No. 14184451, dated Apr. 9, 2015.

* cited by examiner

TRACTOR COUNTERWEIGHT MOUNTING

BACKGROUND OF THE INVENTION

Field of Invention

The present invention relates to support linkage arrangements for the mounting of a counterweight to the front of a tractor, and in particular to a top link for use in a three-point support linkage where the lower links are fixed relative to a chassis of the tractor.

Description of Related Art

The continuing trend for agricultural machinery to grow in size goes hand-in-hand with the increasing size and power of tractors. Technical advances have allowed the power of tractors to increase without a proportionate increase in overall weight. In some applications this is advantageous, for example where soil compression is to be avoided. However, in order to transmit the power of the tractor to the ground without excessive wheel slippage, it is known to provide counterweights on either the front or the rear of the tractor depending on the application.

WO 2000/051613 discloses a single-piece tractor weight which can be attached to a front three-point linkage of a tractor by means of a transverse crossbar and a top-link hitching point. The transverse crossbar is supported on the lower links such as to permit the counterweight to pivot about the axis of the crossbar. The pivoting is useful during mounting of the counterweight, whether by simply hanging the counterweight in place by the use of a front loader or fork lift truck or similar, or by having a powered lift mechanism which allows the lower links to be lowered to receive the crossbar and then raised to lift it clear of the ground. However, the pivoting causes problems during normal working if the counterweight can swing such as to impact the chassis or bodywork of the tractor. Some known tractors have a mechanical stop extending from the chassis to constrain the extent of pivoting: the solution preferred in WO 2000/051613 (which has a front powered lift with pivoting lower links to pick up the counterweight) is to use an upper hitch link arrangement which is mounted to the chassis and extends to the top-link hitching point of the counterweight and prevents pivoting.

Problems can occur when mounting the counterweight in aligning the connections for the top link if the counterweight has pivoted out of the desired position, unless the top link is of a more complex variable length construction, for example as a hydraulic cylinder or threaded telescoping arrangement. Problems can also occur when demounting the counterweight if the constrained pivoting action places the top link in compression or tension, either of which can make it difficult to disengage the means (mounting bolts, pins etc.) used to attach the top link to the counterweight.

SUMMARY OF THE INVENTION

It is an object of the present invention to provide a means for stabilising a counterweight which at least partially mitigates the above problems.

In accordance with a first aspect of the present invention there is provided a top link for a tractor front counterweight support linkage, said link comprising a fixed length elongate body having at a first end a mechanism enabling pivoting connection with a chassis of the tractor and at a second end a slot to slidably receive an attachment bolt connectable to a tractor front counterweight, the link further comprising a user operable mechanism to selectively permit or prevent sliding movement of an attachment bolt received in the slot.

The term "attachment bolt" as used herein includes all such bolts, screws, rivets, pins and similar fixing means as may be used in connecting the end of the top link to the counterweight, provided that the fixing means is capable of being slidably received in the slot. The provision of the slot simplifies the mounting and demounting operations for the counterweight by allowing limited pivoting, with the user operable mechanism enabling locking to prevent pivoting during normal operation.

The user operable mechanism to selectively permit or prevent sliding movement of an attachment bolt may comprise an opening to receive a second attachment bolt adjacent to the slot, or it may take the form of a retaining pin extending through the slot in a position to trap a received attachment bolt at one end of the slot. Various potential configurations of user operable mechanisms are described below with reference to exemplary embodiments of the invention. Having a simple mechanical mechanism to permit and prevent pivoting provides the benefits in terms of ease of mounting and demounting of a front counterweight without the expense of an adjustable variable length top link.

In accordance with a further aspect of the present invention there is provided a support linkage for mounting a tractor front counterweight, the linkage including a pair of lower links fixed relative to a chassis of the tractor, and a top link according to the first aspect of the invention.

In accordance with a still further aspect of the present invention there is provided a tractor having a chassis with a support linkage as recited in the preceding paragraph mounted to a front end thereof. Such a tractor may further comprise a user-operable suspension adjustment mechanism by the operation of which the front end of the tractor chassis may be raised and lowered.

BRIEF DESCRIPTION OF THE DRAWINGS

Further advantages will become apparent from the following description of the invention, by way of example only, with reference to the accompanying drawings in which.

DESCRIPTION OF EXAMPLE EMBODIMENTS

Figure 1:
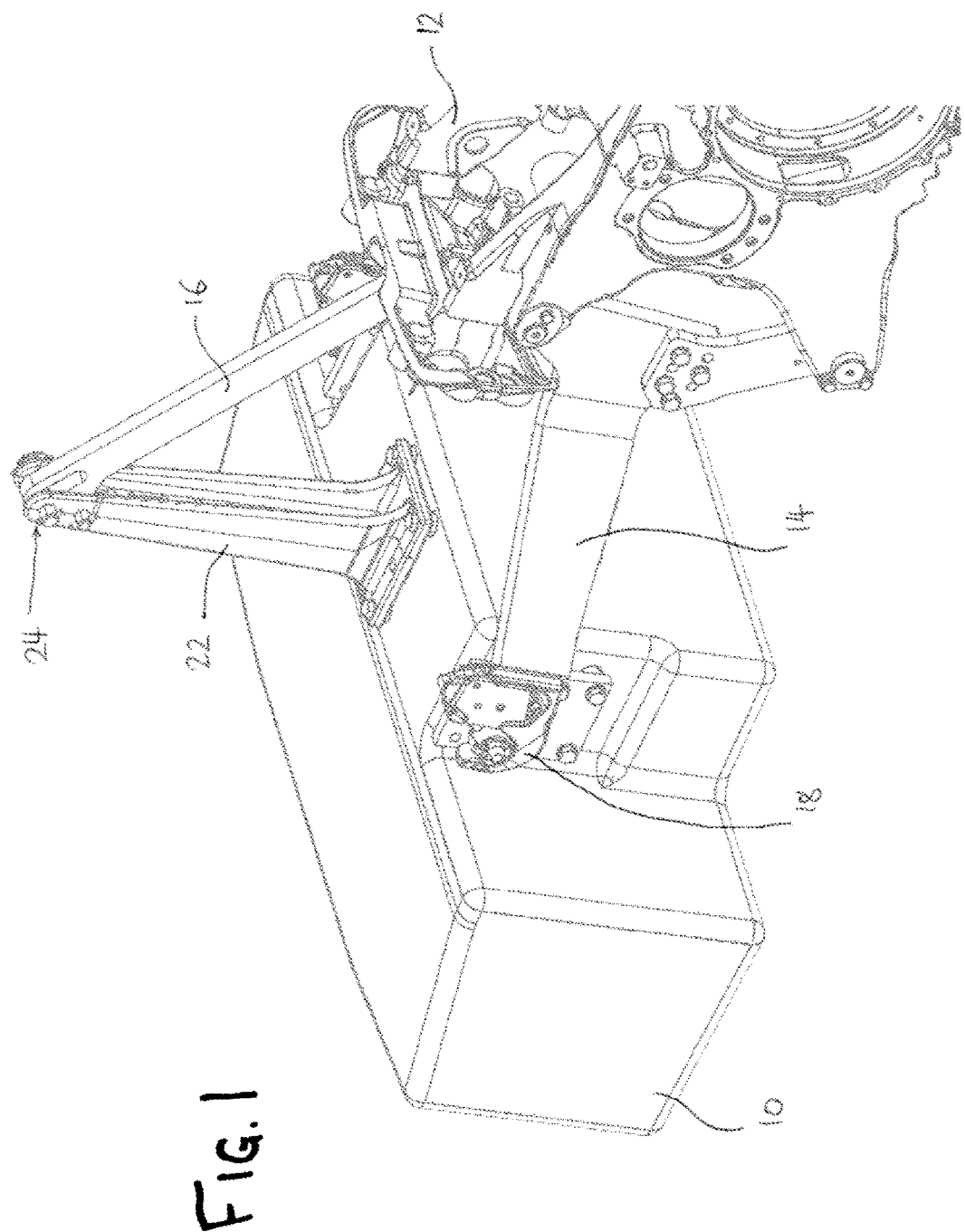
FIG. 1 is a perspective view of a tractor front counterweight assembly mounted on a front three-point linkage of a tractor including a top link according to one embodiment of the invention.
Figure 2:
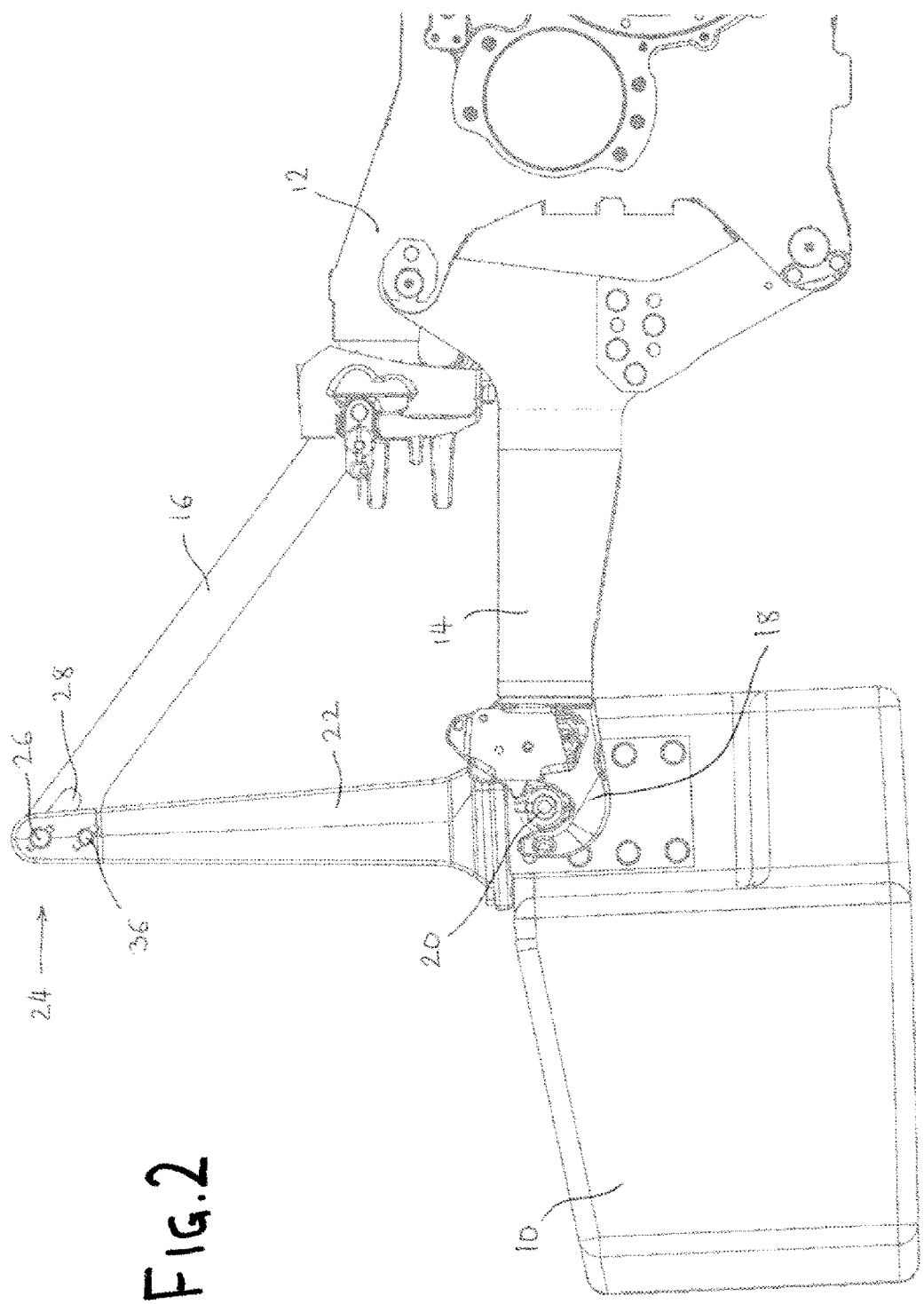
FIG. 2 is side elevational view of the mounted tractor counterweight assembly and linkage arrangement of FIG. 1.

Referring initially to FIGS. 1 to 3, a counterweight 10 is mounted to the front end of a tractor chassis 12, which chassis includes a housing for a front axle drive, as shown in FIG. 1. The counterweight 10 is mounted by a three-point linkage arrangement consisting of a pair of lower links 14 and a top link 16. Each of the lower links 14 is fixedly attached at one end to the chassis 12 and at the other is provided with an implement attachment mechanism such as a quick-release hook 18 as shown. The hooks 18 cooperate with laterally extending pins 20 from the counterweight 10 to support the counterweight on the lower links 14.

An upright post 22 is mounted to the top of the counterweight and provides at its upper end a top-link hitching point 24 which receives a first attachment bolt 26, which first attachment bolt is received in a slot 28 in the top link 16. As shown particularly in FIGS. 3A and 3B, the top link 16 is a fixed length elongate body having the slot 28 at one end and a mechanism enabling a pivoting connection to the tractor chassis (in this case an opening 30 lined with a bush 32) at the other end. As shown by FIGS. 1 and 2, the top link is pivotally connected to the tractor chassis 12 at a point above the lower links and on the mid-line of the vehicle.

Figure 3A:
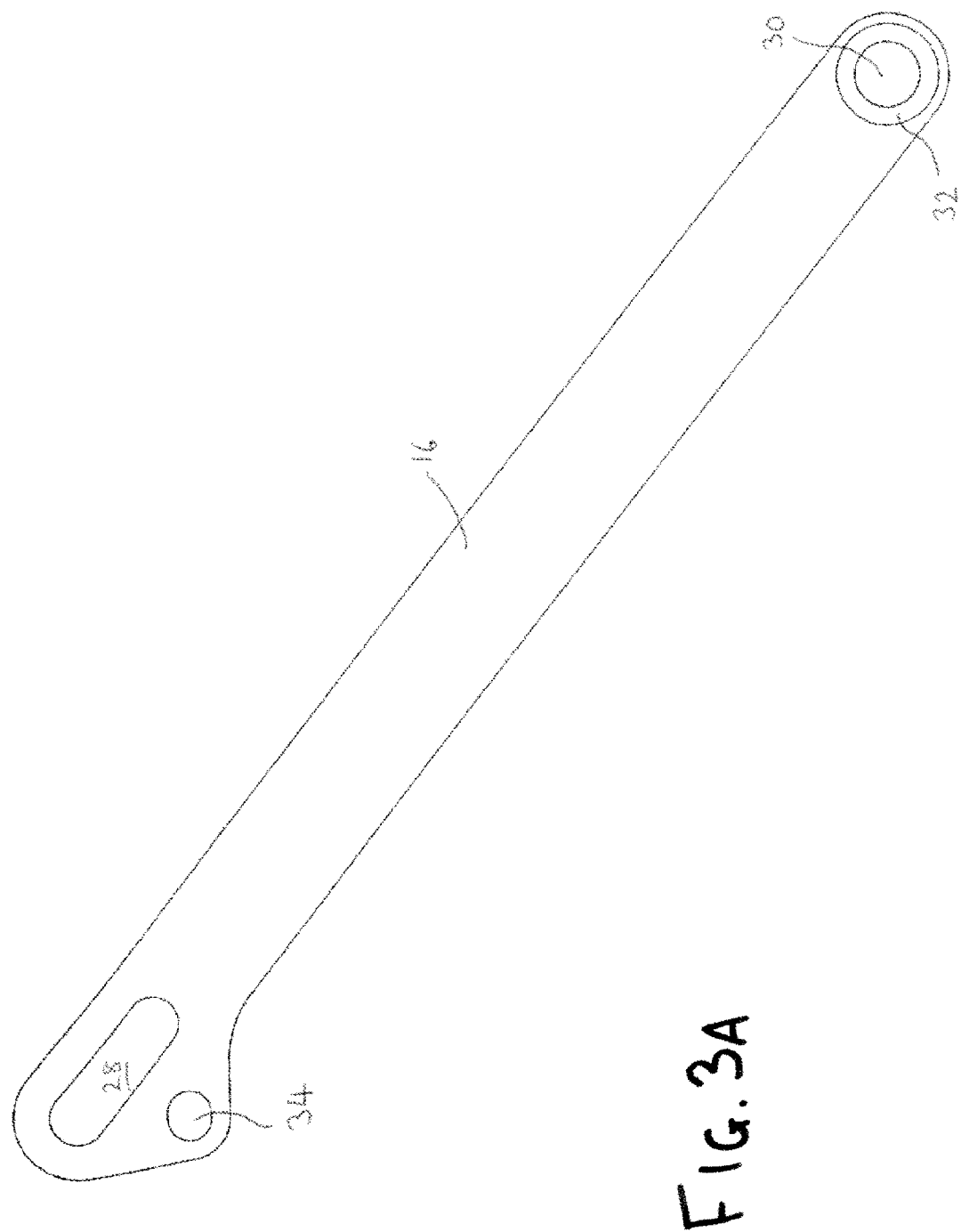
FIGS. 3A and 3B show respectively side elevation and perspective views of the top link of FIGS. 1 and 2.
Figure 3B:
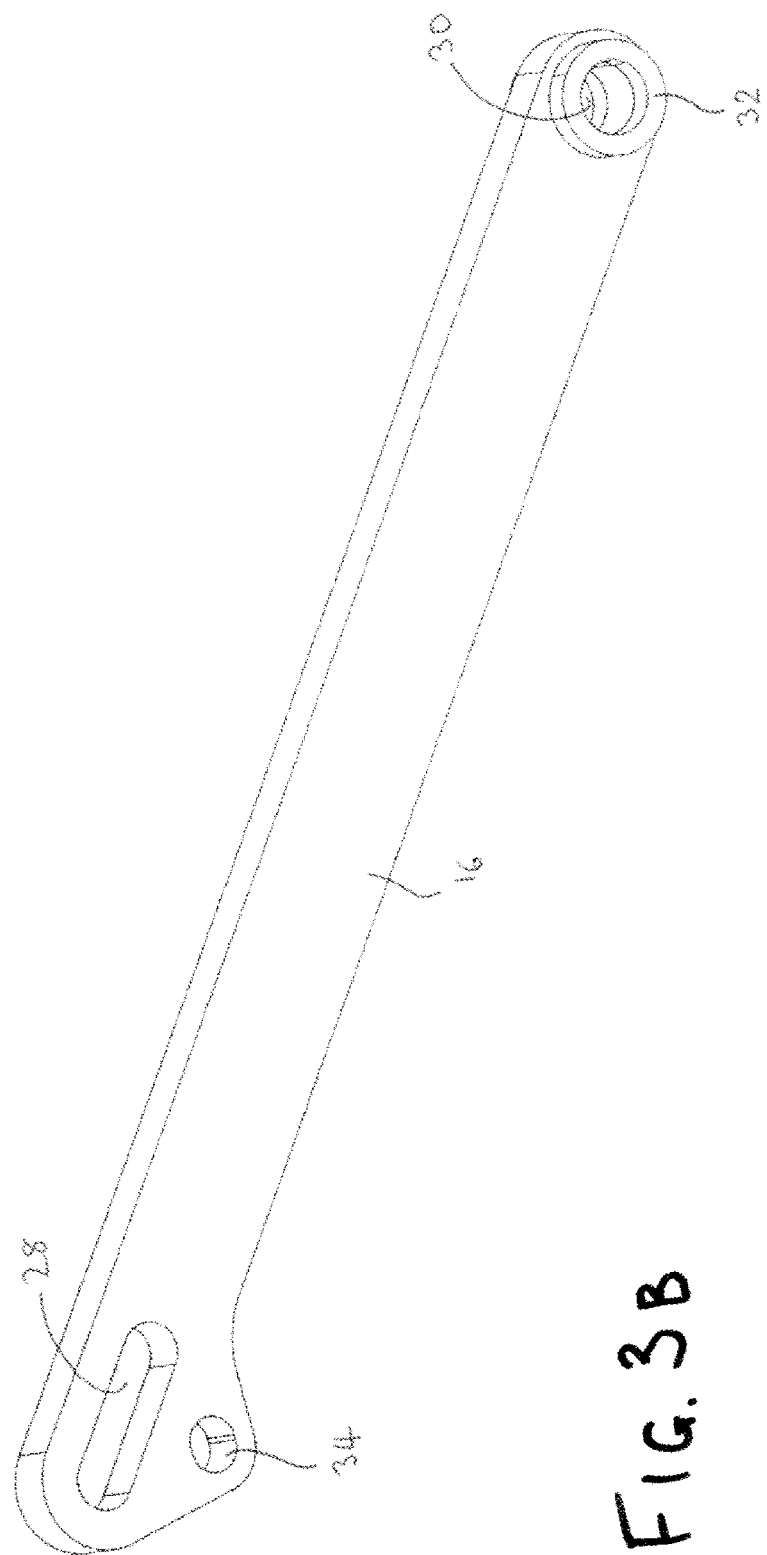

As can be seen particularly in FIG. 3A, at the forward end of the top link 16 adjacent the slot 28 there is a second opening 34 (this time a round hole) to receive a second attachment bolt 36 (FIG. 2). This arrangement addresses the prior art problem of attachment bolts being difficult to remove from a top-link hitching point 24 when the top link 16 is under tension, which arises as the counterweight 10 rotates in quick-release hooks 18 about the axis of the laterally extending pins 20.

Figure 4:
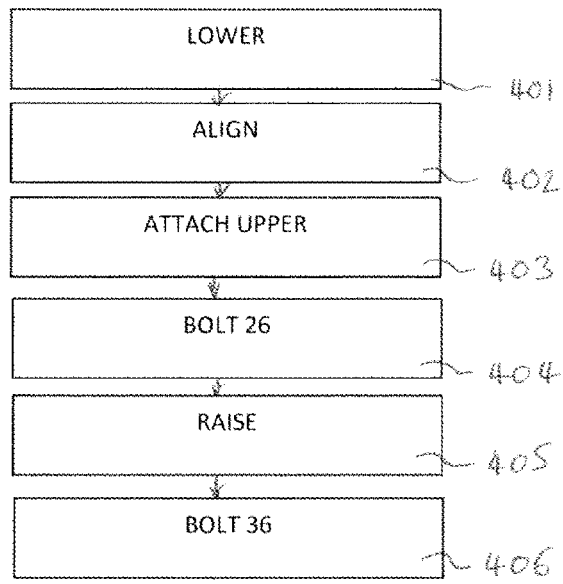
FIG. 4 is a flow chart representation of the steps of mounting the counterweight assembly of FIGS. 1 and 2.

The steps of the counterweight mounting process are shown in FIG. 4 and begin at 401 with the tractor front suspension being lowered such that the lower links 14 and hooks 18 (fixed relative to the tractor chassis) are below the level of the pins 20. Next, at 402, the tractor advances such that the hooks 18 are aligned below the pins 20.

At step 403 the top link 16 is attached to the chassis 12 or, if already fitted but stowed in a travelling position, released such as to be in pivoting connection to the chassis. At step 404 the top link 16 is pivoted to bring the free end to the top-link hitching point 24 and the first attachment bolt 26 is attached through the slot 28 to the hitching point such that the top link 16 and upright post 22 are slidably connected.

At step 405 the tractor suspension is raised which causes the hooks 18 to engage the pins 20. As the counterweight is raised from the ground it will begin to rotate about the axis of the pins 20. In the orientation of FIG. 2, as the counterweight rotates anti-clockwise, the first attachment bolt 26 will slide to the left-hand end of the slot 28, thereby preventing further rotation. At this point, the second opening 34 is aligned with a hole in the top-link hitch and at step 406 attaching the second attachment bolt 36 then locks the counterweight 10 against rotation in the clockwise direction.

Demounting the counterweight 10 simply involves reversing the order of steps 401 to 406.

As will be recognised, having the slot 28 enables the top link connection to be made even when the upright post 22 is not absolutely vertical, as is likely to be the case when the weight is being picked up from an uneven (possibly sloping) surface. The longer the slot, which may require a longer top link overall, the greater will be the angle off vertical for the post 22 that can be accommodated.

Figure 5:
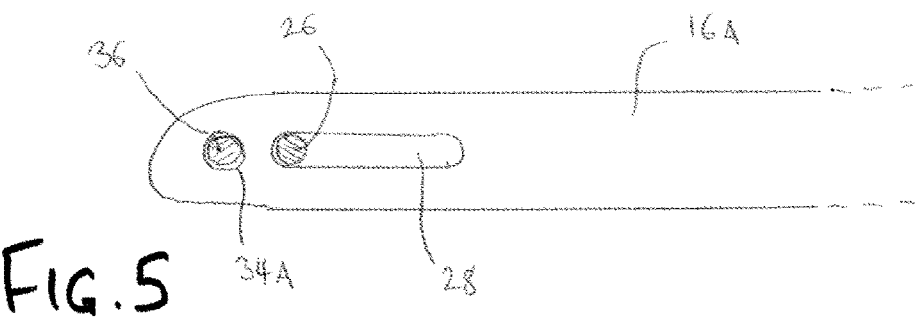
FIG. 5 shows a first alternative embodiment of a top link according to the present invention.

FIG. 5 shows a first alternative design for the free end of the top link 16A. As before, the link is provided with a user-operable mechanism to selectively allow or prevent movement of the first attachment bolt 26 in the slot. As for the embodiment of FIG. 3, this restraining mechanism is in the form of a second opening 34A through the link to receive the second attachment bolt 36 when the first attachment bolt 26 is at one end of the slot 28, but this time the centre of the second opening is aligned with the principal axis of the slot rather than being alongside it.

Figure 6:
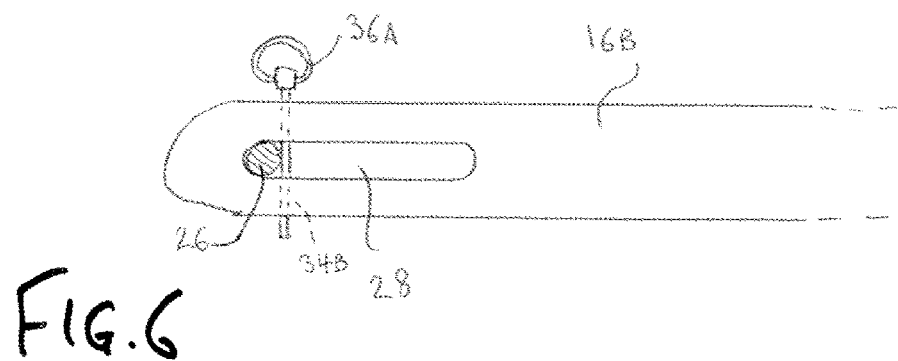
FIG. 6 shows a second alternative embodiment of a top link according to the present invention.

FIG. 6 shows a second alternative design for the free end of the top link 16B. As before, the link is provided with a user-operable mechanism to selectively allow or prevent movement of the first attachment bolt 26 in the slot 28. As for the embodiment of FIG. 3, this restraining mechanism is in the form of a second opening 34B through the link to receive the second attachment bolt 36A, which second attachment bolt 36A is in the form of a retaining pin such as a cotter pin or similar. The second opening intersects the slot and holds the first attachment bolt 26 at one end of the slot, with the principal axes of the attachment bolt 26, the slot 28 and the retaining pin 36A being mutually orthogonal.

The invention claimed is:

1. A top link coupled a tractor front counterweight support linkage, said top link comprising:
    a fixed length elongate body having at a first end a mechanism enabling a pivoting connection with a chassis of a tractor and at a second end, a slot to slidably receive a first attachment bolt connectable to a tractor front counterweight; and
    a user operable mechanism to selectively permit or prevent sliding movement of the first attachment bolt received in the slot.

2. The top link according to claim 1, wherein the user operable mechanism to selectively permit or prevent sliding movement of the first attachment bolt is an opening to receive a second attachment bolt adjacent to the slot.

3. The top link according to claim 1, wherein the user operable mechanism to selectively permit or prevent sliding movement of the first attachment bolt is a retaining pin extending through the slot in a position to trap a received first attachment bolt at one end of the slot.

4. The top link according to claim 3, wherein each of the first attachment bolt, the slot, and the retaining pin has a respective principal axis, and wherein the principal axes of the first attachment bolt, the slot and the retaining pin are mutually orthogonal.

5. A support linkage for mounting a tractor front counterweight to the tractor comprising:
    a pair of lower links fixed relative to the chassis of the tractor; and
    the top link according to claim 1.

6. A tractor chassis with the support linkage according to claim 5 mounted to a front end thereof.

7. A top link coupled a tractor front counterweight support linkage, said top link comprising:
    a first attachment bolt connectable to a tractor front counterweight;
    a fixed length elongate body having at a first end a mechanism enabling a pivoting connection with a chassis of a tractor and at a second end, a slot to slidably receive the first attachment bolt, wherein the first attachment bolt slides in the slot when the tractor front counterweight is raised off of the ground; and
    a user operable mechanism comprising a removable retainer received in an opening of said fixed length elongate body, said opening being registered with said slot so that when the retainer is installed in the opening, the retainer prevents sliding movement of the first attachment bolt received in the slot when said first attachment bolt is in a position with the tractor front counterweight raised from the ground.

8. The top link according to claim 7, wherein the retainer of the user operable mechanism is a second attachment bolt configured to be received in the opening which is adjacent to the slot.

9. The top link according to claim 7, wherein the retainer in the user operable mechanism to selectively prevent sliding movement of the first attachment bolt is a retaining pin extending through the slot in a position to trap the first attachment bolt at one end of the slot.

10. The top link according to claim 9, wherein each of the first attachment bolt, the slot, and the retaining pin has a respective principal axis, and wherein the principal axes of the first attachment bolt, the slot and the retaining pin are mutually orthogonal.

11. A support linkage for mounting a tractor front counterweight to the tractor comprising:
   a pair of lower links fixed relative to the chassis of the tractor; and
   the top link according to claim 7.

12. A tractor chassis with the support linkage according to claim 11 mounted to a front end thereof.

\* \* \* \* \*